June 14, 1960 J. R. ANDERSON 2,941,135
CURVE FOLLOWER SERVOSYSTEM
Filed Feb. 16, 1959 4 Sheets-Sheet 1
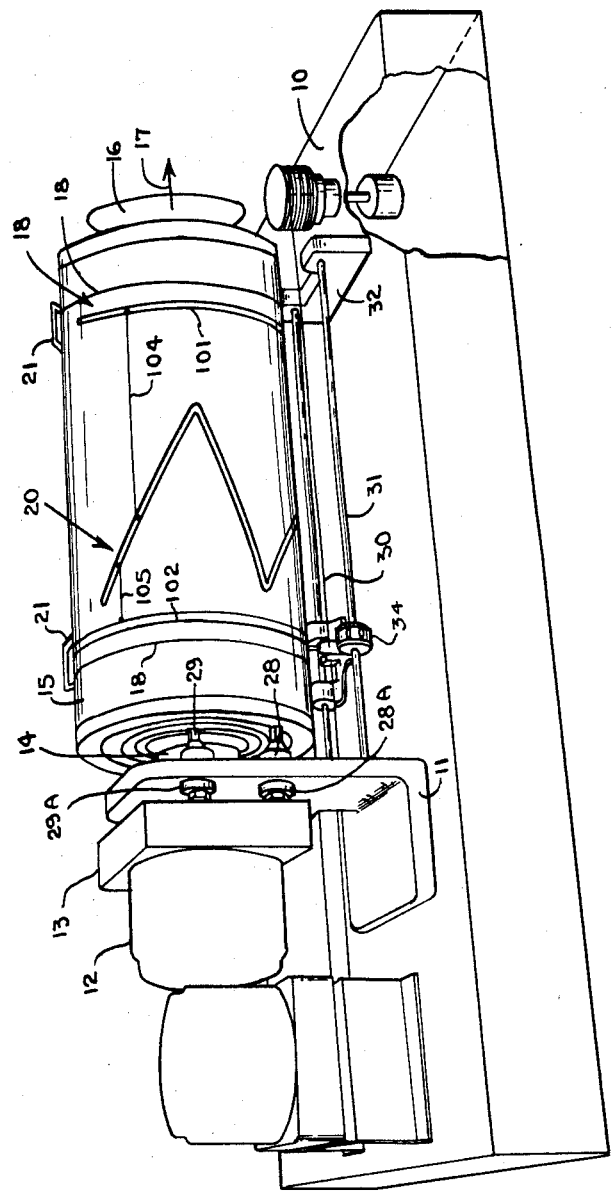
INVENTOR
JAMES R. ANDERSON
BY Dugger & Johnson
ATTORNEYS June 14, 1960   J. R. ANDERSON   2,941,135
CURVE FOLLOWER SERVOSYSTEM
Filed Feb. 16, 1959   4 Sheets-Sheet 2
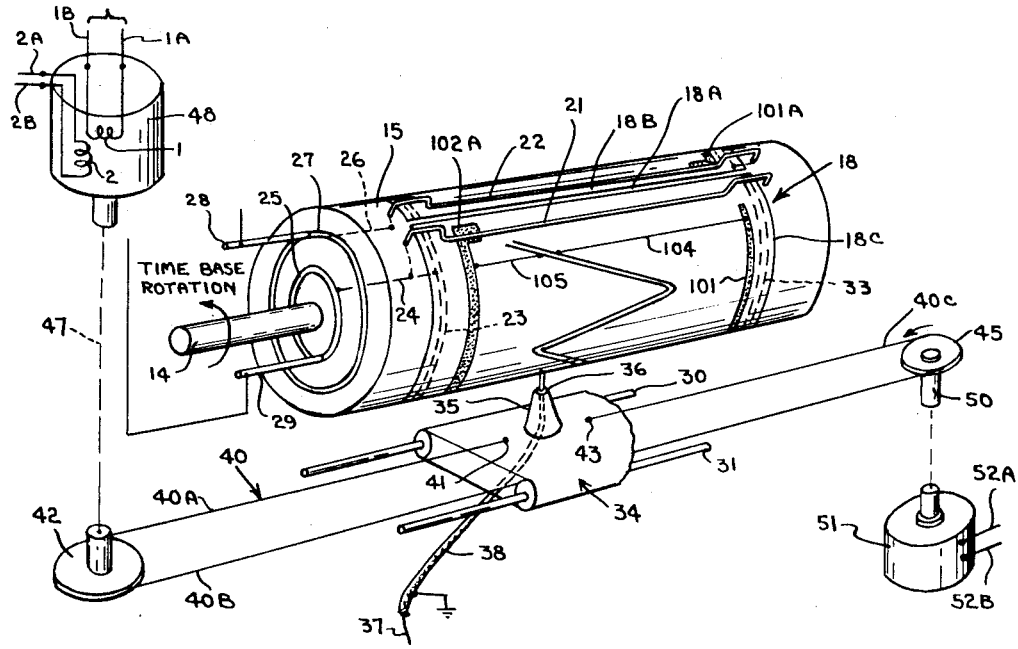
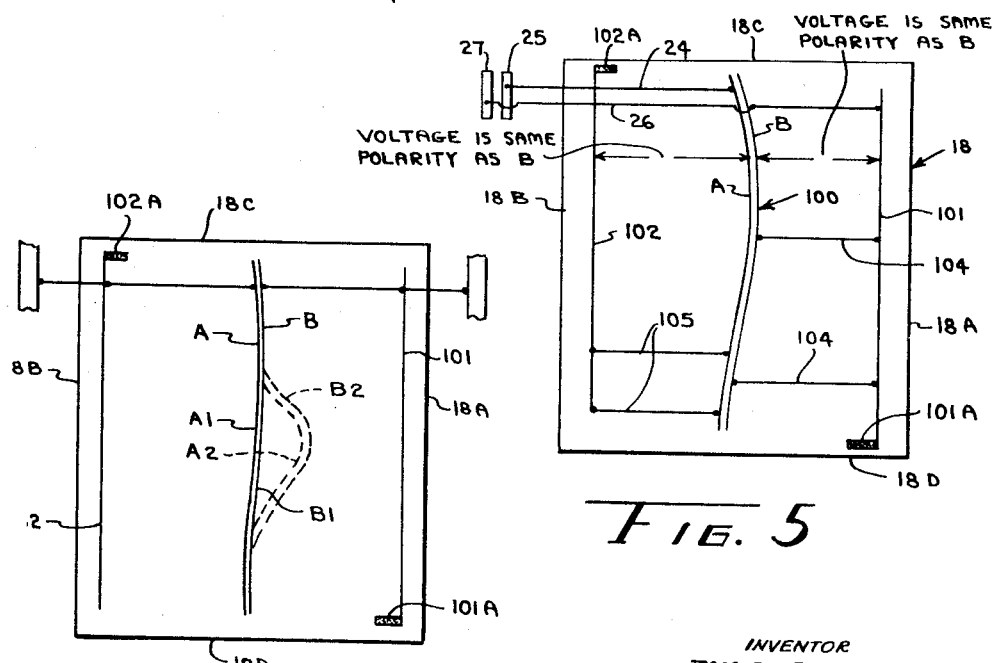
INVENTOR
JAMES R. ANDERSON
BY
Dugger & Johnson
ATTORNEYS

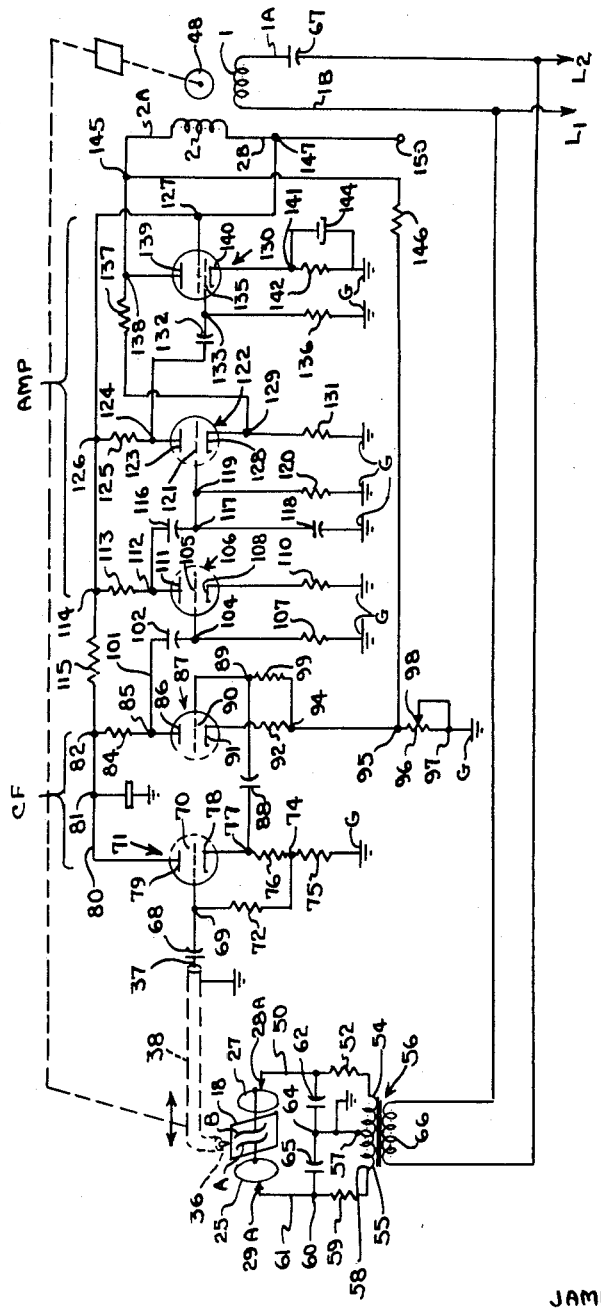

June 14, 1960  J. R. ANDERSON  2,941,135
CURVE FOLLOWER SERVOSYSTEM
Filed Feb. 16, 1959  4 Sheets-Sheet 4
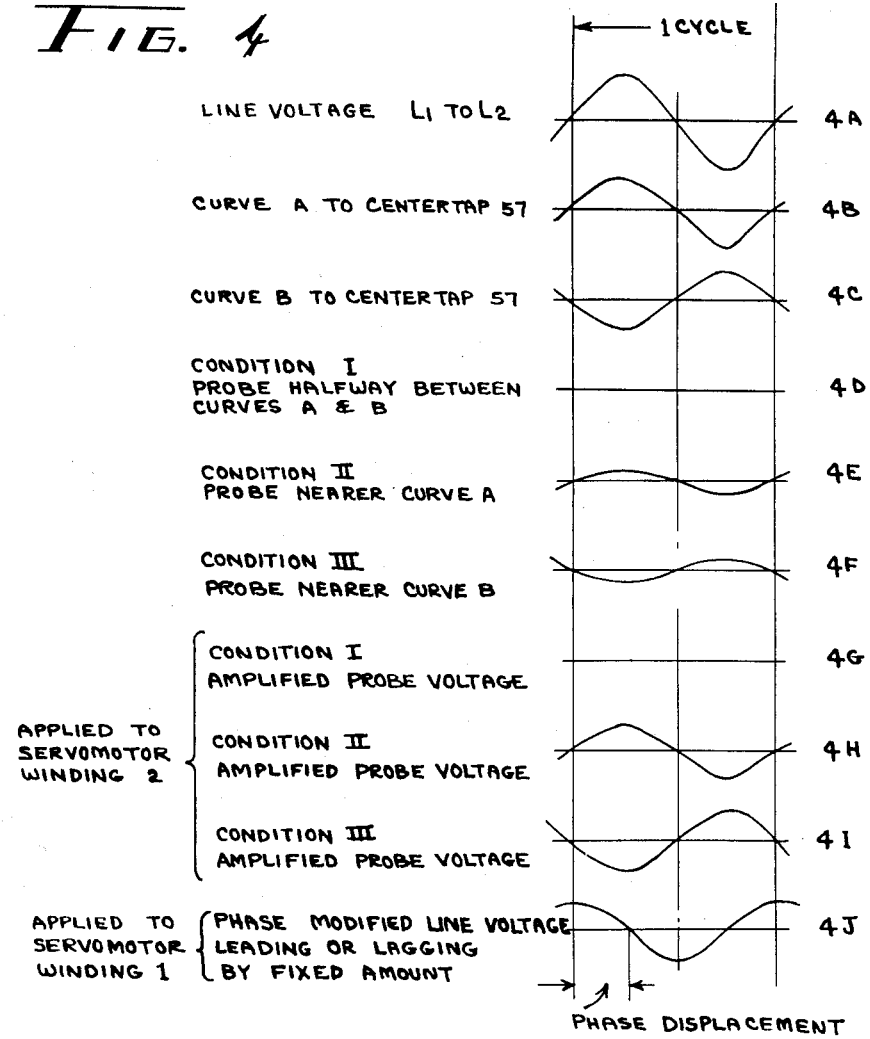
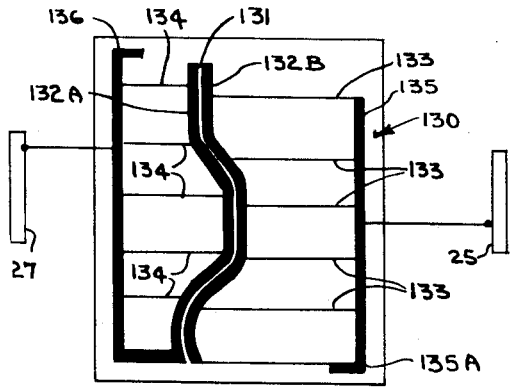
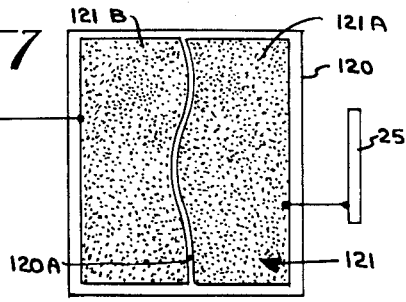
INVENTOR
JAMES R. ANDERSON
BY
Wugger & Johnson
ATTORNEYS United States Patent Office 2,941,135
Patented June 14, 1960

2,941,135

CURVE FOLLOWER SERVOSYSTEM

James R. Anderson, Minneapolis, Minn., assignor to Research, Incorporated, Hopkins, Minn., a corporation of Minnesota Filed Feb. 16, 1959, Ser. No. 793,400

12 Claims. (Cl. 318—31)

This invention relates to curve follower apparatus. In such an apparatus the objective is the production of an electrical signal having a prescribed relationship to one coordinate of a curve. In many engineering and analytical problems, a curve is provided from which it is desirable to produce an electrical signal. Prior art devices of this character have utilized two main principles for causing a stylus or pointer to follow the curve from which the signal is to be generated. In one form of the prior art devices, the curve is made in the form of a groove milled or cut in a planar surface, and a mechanical stylus is provided which tracks in the groove and causes the movement of a mechanical linkage from the position of which the electrical signal desired is generated. In another form of prior art device, the curve is composed of an electrically conductive material, the resistance of which is sufficiently low so as to permit the passage therethrough of an electrical current. The electrical current passing through the electrically conductive "line" on the curve causes a magnetic field to be generated around the "line." The "follower" is composed of one or more inductance coils, in which a voltage signal is induced, the phase displacement of which is dependent upon the position of the inductance coil or coils with reference to the line. This form of curve follower is called a "magnetically coupled" or sometimes "an inductively coupled" curve follower. In order that such "inductively coupled" curve followers may operate successfully without being unduly bulky, it has been found necessary to pass a current of radio frequency through the conductive "line." A radio frequency magnetic field around the "line" induces a corresponding radio frequency signal in the magnetic coupling of the "curve follower" apparatus.

Such prior art devices of the mechanical type are disadvantageous because of the difficulty of mechanically moving a stylus or pointer which tracks in a groove. In order to obtain good mechanical tracking, the groove must be machined, which is an expensive operation, and curves so produced can not be made or changed easily or at low cost. The "magnetically coupled" types of curve followers, require the use of a conductive ink of relatively high conductivity, for preparing the "curve" which is to be followed. This is true because it is necessary to pass a relatively strong radio frequency current through the (conductive line) "curve" in order to obtain enough "field" so as to obtain a signal (in the inductive coil) of usable proportions. Such "curves" for the magnetically coupled type of curve follower, must be made with care, and once the "curve" is "drawn" with the "conductive ink," it cannot readily be changed.

It is an object of the present invention to provide a curve follower apparatus in which the curves to be followed can be made with an ordinary lead pencil, or other easy method, and in which the curves may be easily modified by the simple erasure and redrawing of the lead pencil lines.

It is a further object of the invention to provide an improved curve follower which does not require the passage of current through the curve, but only requires sufficient conductivity so that a potential gradient is established in the curve.

It is another object of the invention to provide an improved curve following apparatus wherein the curve is generated by providing spaced conductive lines, or alternatively by providing a space between conductive areas, and wherein the curve follower apparatus is organized so that the curve follower obtains a potential from the lines, but is not inductively coupled.

It is a further object of the invention to provide a curve follower apparatus wherein the use of high frequency current is not required, thereby permitting the reduction of the electrical complexity of the apparatus. It is another object of the invention to provide an improved curve follower apparatus which utilizes only commercial A.C. voltages and frequencies and simple, A.C. amplifiers in which the power supply requirements are reduced, and which can be equipped with simple transistor amplifiers of small size, light weight, and great reliability.

It is another object of the invention to provide an improved curve follower apparatus wherein the power supply utilized is any convenient commercial voltage of any usual and available commercial frequency.

Other and further objects are those inherent in the invention herein illustrated, described, and claimed and will be apparent as the description proceeds.

To the accomplishment of the foregoing and related ends this invention then comprises the features hereinafter fully described and particularly pointed out in the claims, the following description setting forth in detail certain illustrative embodiments of the invention, these being indicative, however, of but a few of the various in which the principles of the invention may be employed.

The invention is illustrated with reference to the drawings wherein:

Figure 1 is a perspective view of a curve follower apparatus built in accordance with the present invention;

Figure 2 is a fragmentary schematic perspective view showing certain portions of the apparatus;

Figure 3 is a circuit diagram of the apparatus of the present invention wherein various mechanical portions thereof are shown schematically;

Figure 4 illustrates a group of related curves denoting the relationship of the power supply signals, and output voltages of various parts of the apparatus of the present invention;

Figure 5 is a developed plan view showing one form of curve utilized in accordance with the present invention;

Figure 6 is a developed plan view showing the manner of modification of the curve utilized in the present invention;

Figure 7 is a developed plan view showing an alternative form of manufacture of the curve utilized in the present invention;

Figure 8 is a developed plan view illustrating a further modified form of curve which may be used in accordance with the present invention.

Throughout the drawings corresponding numerals refer to the same parts.

Referring to Figure 1 the apparatus of the present invention includes a base 10 having thereon an upright frame 11, which serves as a support for the geared motor 12. Motor 12 is operated through the gear box 13 so as to drive the shaft 14 which forms the spindle for revolving a tubular supporting device or "drum" 15 on which a piece of paper 18 having the "curve" 20 thereon is wrapped around. The tubular supporting device 15, hereafter designated "drum" 15, is made of electrically non-conductive material, preferably of plastic, and it is preferably made so that it can be slipped onto the spindle 14 and centered and held by means of a removable conical end piece 16, as is well known. By withdrawing the end piece 16 in the direction of arrow 17 the drum 15 may be entirely removed from the spindle 14, so as to permit the sheet of paper (or other material) 18 to be wrapped onto the drum. According to prior art practice the drum 15 is provided with two spaced clip bars 21 and 22 (see Figure 2) which extend lengthwise of the drum 15. These clip bars are made so as to be springy, or they may be made so as to be capable of being moved radially outwardly and inwardly, with suitable detents for holding them against the drum. In this way the opposite end edges 18A and 18B of the graph paper 18 may be slipped under the clip bars 21 and 22 respectively so that the graph paper is held snugly on the exterior surface of the drum 15. When the paper (or other sheet) 18 is wrapped on the drum, the edges 18C and 18D are lined up so as to be at right angles to the drum axis, so that the coordinates of the graph which are parallel to edges 18C and 18D will also lie in planes at right angles to the drum axis.

Referring to Figure 2 the drum 15 has a flat end at the left in Figure 2, having sliprings 25 and 27 thereon. The drum is wired internally so as to have a conductive connection 24 from the clip bar 21 extending to slipring 25 and a similar electrical connection 26 from the clip bar 22 extending to the slipring 27. According to this invention the drum may also have electrically conductive bands on its outer (or inner) surface, located so as approximately to underlie the positions where edges 18C and 18D of the graph paper would normally be located, or slightly in from each edge. These bands are illustrated at 23 and 33 in Figure 2, as being on the inside of drum 15, but could as well be on the outside. Band 23, where used, is electrically connected to the same electrical lead 24 which connects clip 21 to slipring 25, and band 33, where used, is electrically connected to clip 22 and through it to lead 26 and to slipring 27.

On the frame piece 11 there are provided brushholders 28A and 29A in which brushes 28 and 29 respectively are positioned. Brush 28 is positioned so as to run against slipring 27 and brush 29 is positioned so as to run against slipring 25. Connections made to the brushholder 28A and 29A insure electrical contact through the rings 25 and 27 and thence through the internal wiring 24 and 26 to the spring wire clips 21 and 22 and where used, to bands 23 and 33, respectively. Clips 21 and 22 establish electric circuit connections to portions of the graph, as will later be explained.

Extending from the frame piece 11 are a pair of rods 30 and 31, which at their outer ends (the right end as shown in Figure 1) are supported by a low frame member 32. These rods are parallel to each other and to the axis of rotation of the drum 15 and serve as slideways on which a slider element generally designated 34 is adapted to move.

The slider 34 is provided with an insulated holder 35 as shown in Figure 2 which is preferably located precisely under the axis of the drum 15. As the slider 34 moves along the rods 30 and 31 to the right or left in Figures 1 and 2, the holder 35 will move along under the center line of the drum 15.

The holder 35, which is of insulating material, has a central vertical shielded electrical conductor extending through it at 36. This conductor is positioned so that its upper end is slightly spaced from the surface of the graph paper 18 on the cylinder 15. This spacing need not be very precise. It may vary from a few thousandths of an inch to as much as one eighth of an inch, with reasonably good results. The conductor 36 should preferably have a moderately rounded upper surface, although the exact curvature of the surface is not of critical importance. It is worth mentioning that an ordinary wire clipped off and smoothed a little, but not otherwise finished, works satisfactorily. For mechanical reasons it is preferable that the upper end of the conductor 36 should be reasonably smooth so as not to snag the graph paper 18 as the cylinder 15 (with the graph paper on it) is inserted onto the spindle 14.

Extending downwardly from the upper tip of the conductor 36 is a flexible connecting wire 37 which has a shield 38 thereon of metallic material which is grounded so as to preclude extraneous signals being received on a conductor 36 and the flexible connecting wire 37. The arrangement consisting of the parallel rods 30—31, the slider 34 and the conductor 36 and the wire 37 thus provides for picking up a potential signal at a position slightly spaced from the surface of the paper 18. The potential signal is supplied, as will be described hereinafter by spaced and reasonably, but not necessarily precisely, parallel conductive lines (or edges of conductive areas) on the graph paper 18.

The movement of the slider 34 is provided by means of a wire 40 which is anchored to the slider at 41 and extends at run 40A to and around a pulley 42 and thence along a parallel run at 40B to and around pulley 45 and thence along the run 40C to another anchorage at 43 on the slider 34. The wire is pulled moderately tight so that there is no appreciable slippage between the wire and the pulleys 42 and 45.

The pulley 42 is mounted on the shaft 47 of an ordinary servomotor 48. The servomotor is provided with two pairs of leads 1A and 1B for one of its windings, designated 1, shown schematically in Figure 2, and another pair of leads 2A and 2B for the other winding designated 2. It may be pointed out that the servomotor 48 is of a standard stock variety which is suitable for use at any standard voltage or frequency. No special voltage or frequency equipment is required.

The pulley 45 is mounted upon a shaft 50 connected to a potentiometer 51, having the output terminals 52A and 52B, which provide the useful electrical output signal of the apparatus. As the slider 34 moves along the rod 30—31 to follow a graph line upon the paper 18, the wire 40 attached to the slider 34 will rotate the pulley 45 and hence rotate the potentiometer so that a signal is provided at 52A—52B which is coordinated with the position along the rods 30—31 at which the slider 34 is situated. The same servomotor 12 which rotates the drum 15 with the graph paper 18 upon it can be used to operate another potentiometer (not shown), if desired, or the incoming signal to the motor 12 which causes its rotation may be used, as another coordinate signal which (with the signal on lines 52A—52B), represents the two coordinates of the graph on the paper 18.

Referring to Figure 5 there is illustrated one form of graph 18, with a "curve" thereon which may be utilized in accordance with the present invention. Any electrically non-conductive sheet of paper, plastic or the like, which is capable of being flexed, can be used. For convenience, and economy, one may, in accordance with the present invention, utilize plain ordinary paper with pencil lines thereon as the graph. Ordinary "graph paper" with coordinates printed faintly with non-conductive ink may be used. As will be later pointed out, there are other ways of making a "graph" suitable for use with the present invention and these are included within the purview of the invention. However, for convenience in description the graph will be described with reference to a piece of paper 18 on which a certain curve, which is to be followed, is depicted.

Thus, in Figure 5 there is a piece of paper 18 having side edges 18A and 18B and end edges 18C and 18D. The "curve" which is drawn on the paper in accordance with this invention consists of a pair of relatively closely spaced lines which, for best results, should be reasonably parallel. It may be noted, however, that precise parallelism of the two lines which constitute the "curve" is not essential. They may vary in spacing. Thus, on paper 18 there is depicted a curve generally designated 100 which is composed of parallel lines A and B. All that is essential for operation of the invention is to have these two parallel lines extend across graph paper 18 from a place spaced a little from one edge, such as 18C to a position spaced a little from the other edge 18D. The margins adjacent edges 18C and 18D are left clear to receive clips 21 and 22. Then, all that is absolutely essential is that one of these lines, for example the line A, should be connected to one of the sliprings 25 and at the other line B should be connected to the other slipring 27. This is schematically illustrated in Figure 5.

The lines A and B are only slightly conductive, as for example, the conductivity of a pencil line.

To reiterate, the graph need only provide a pair of reasonably parallel lines A and B which need not be of high conductivity, but can be simply of a conductivity of the same order and magnitude of pencil lines on a piece of paper. One of these lines A is connected to one of the incoming circuits via slipring 25 and the other line is connected to the other incoming circuit via slipring 27.

In Figure 5 there are shown additional optional conductive lines on the graph 18. Thus along the edge 18A there is another conductive line at 101 and along the edge 18B there is a conductive line at 102. The line 101 is connected straight across to the curve B by one or a plurality of cross lines 104—104, the number and position of which is entirely optional. Similarly, the line 102 is connected to the curved line A by a plurality of connecting lines 105—105, the number and position of which are likewise entirely optional. Indeed the use of the conductive lines 101 and 102, and of the lines 104 and 105 is optional in the present invention although some improvement in operational results is usually thereby provided.

The theory of this device is this: The two parallel lines A and B are connected to the two leads of an alternating current power source which can be any ordinary commercial voltage of for example 110 volts to 300 or 500 volts, and any ordinary commercial frequency. Between the two lines A and B there is accordingly a certain position at which a potential exists (and which may be picked up by the probe 36) and this potential will be of a voltage which is halfway between the voltage applied to the two lines A and B. The probe 36, as will later be explained, picks up this voltage and as long as the probe voltage is halfway between the voltage on line A and the voltage on line B, the probe is not moved (by slider 34) transversely in respect to the lines A and B. However, if the direction of the curve changes, the probe 36 is, in effect, brought nearer one or the other of the lines. This causes a voltage to be picked up by the end of the probe which is more nearly the potential of the line A (or the line B) to which the probe is adjacent. This "probe voltage" is then amplified, as will be explained, and causes the rotation of the servomotor 48 so that slider 34 is moved to again center the probe at a position midway between the lines A and B.

The reason for the supplemental lines 101 and the connections 104 to the line B and the supplemental line 102 and the connecting lines 105 to the line A is to help in re-locating the probe in case it should "get lost," that is to say, have a position which is to the left of the line A in Figure 5 or to the right of line B in Figure 5. If, for example, the probe 36 should be to the left of line A in Figure 5, the voltage picked up by the probe would be more nearly the potential of line A than it would be the potential of line B, but the signal is weak. However, by establishing closed "areas," by use of the line 102 and the cross lines 105 (each enclosed "area" is bounded by lines, for example, the line 102, the two lines 105 and a portion of the line A) which are all at the potential of line A. Hence, the signal picked up by the probe at any position within this "area" is reinforced more than if the lines 102 and 105—105 were not used. Also as the drum 15 rotates, one of the lines 105 (in the situation illustrated), or lines 104, if the probe is "lost" at a position to the right of line B, would come under the probe, thereby giving a strong signal for returning the probe to the center position. Hence, the use of the lines 102 and 105 in respect to the curve line A and the use of the lines 104 and 101 in respect to the curved line B tend to establish a higher potential signal on the probe in the event it should get to a lost position either at the left of line A or to the right of line B in Figure 5. It must be understood, however, that the apparatus can be operated with good success even without lines 101 and 102, and 104 and 105.

Where bands 23 and 33 are used on the drum, these serve merely as permanent "lines" equivalent respectively to lines 102 and 101. Where graphs of more or less uniform width (between edges 18A and 18B) are used, the bands 23 and 33 are quite practical.

It is preferable also on the graph paper to draw in a spot 101A which is electrically connected to line 101 and against which the clip 22 can easily be located. A similar spot 102A connected to line 101 is provided against which the clip 21 can be located. Line 101 is shortened at one end so as not to extend under clip 21 and line 102 is shortened at the other end so as not to extend under clip 22.

All of the lines 101—105 can be drawn in with ordinary lead pencil, no care being required concerning the nicety of the work, with the single exception that the lines should not be drawn so as to connect both of the curve lines A and B. So long as a little clear space is allowed between the two curve lines A and B the signal picked up by the probe is quite adequate.

Referring to Figure 3, the graph paper or other sheet material from which the graph is made, is shown at 18 and the two lines A and B are schematically illustrated. In Figure 3, the space between the lines A and B is exaggerated. The curve A is connected to the slipring 25 and hence to the brushholder 29A. The curve B is connected to the slipring 27 and hence to the brushholder 28A. The brushholder 28A is connected via line 50 through junction 51 and resistor 52 to terminal 54 of the secondary winding 55 of the transformer generally designated 56. The secondary winding has a center tap at 57 and its opposite end connection 58 is connected through the resistor 59 and junction 60 and thence through line 61 to the brushholder 29A. From junction 51 a circuit extends through the condenser 62 to the center tap 64 and thence through the condenser 65 to the junction 60. From center tap 64 a circuit extends to the center tap 57 of the transformer secondary winding and this connection is grounded as illustrated.

The primary winding 66 of the transformer is connected to an ordinary commercial power supply of convenient voltage and frequency illustrated at lines L1 and L2. By way of example, the power supply can be 110 volt, 60 cycle, or any other commercial or noncommercial frequency. Lower frequencies such as 25 cycle, at any ordinary and convenient voltage, may be used. Likewise special frequency such as 400, 500, or 800 cycles may be used. The voltage between lines A and B can be of either lower or higher voltage than a normal 110 volt supply. Where available voltages in the range of 110 volts to several hundred volts may be used. There is really no upper limit, except those imposed by the spacing of the lines A and B on the graph and safety considerations. Voltages no greater than 220 volts give excellent results.

The servomotor 48 and the drive motor 12 are chosen from stock equipment so as to be suitable for the power supply available. Line L1 of the power supply is also connected to the terminal 1B of winding 1 of the servomotor 48, the opposite terminal 1A of said winding being connected through a condenser 67 to the opposite line L2. The condenser 67 serves to shift the phase of the current flowing through the winding 1 of the servomotor 48. An inductance could just as well be used but is not preferred due to size and cost. It is only necessary that the current in winding 1 be shifted in phase with respect to the line voltage.

From probe 36 the flexible connector 37, which is shielded by the metallic grounded shield 38, is connected to a condenser 68 and thence through junction 69 to the grid 70 of the cathode follower tube 71. The junction 69 is connected through resistor 72 to junction 74 and thence through resistor 75 to ground G. From junction 74 a circuit extends through resistor 76 and junction 77 to the cathode 78 of the tube. From the plate 79 of this tube a circuit extends via line 80 and through junction 81 and junction 82 to resistor 84 and thence through junction 85 to the plate 86 of the cathode follower tube 87. From junction 77 of tube 71 a circuit extends through the condenser 88 to junction 89 and thence to the grid 90 of the tube 87. From a cathode 91 of the tube 87 a circuit extends through resistor 92 and junction 94 to junction 95 and then through resistor 96 and junction 97 to ground G. The resistor 96 is provided with a shorting lead at 98 so that the amount of resistance may be adjusted. Resistor 99 is connected between junction 94 and 89. The two tubes 71 and 87 provide in effect a cathode follower circuit shown under the bracket CF which faithfully provides at junction 85 a voltage corresponding to the voltage picked up on the probe 36. This voltage is applied through circuit 101 and condenser 102 to junction 104 and thence to the grid 105 of a first stage amplifier tube 106. The grid junction 104 is connected through resistor 107 to ground G. The cathode 108 of tube 106 is connected through resistor 110 to ground G. The plate 111 of the tube 106 is connected through the junction 12 and thence through resistor 113 to junction 114. Resistor 115 is connected between junctions 82 and junction 114. The amplified ouput at junction 112 is applied through condenser 116 to junction 117, which is connected through condenser 118 to ground G. Junction 117 is connected to junction 119, which is in turn connected through the grid lead resistor 120 to ground G and is connected to the grid 121 of the second stage amplifier tube 122. The second stage amplifier has its plate 123 connected through junction 124 and resistor 125 to junction 126 which is likewise connected to junction 114 and to grid terminal 127 of the third stage amplifier tube 130. The cathode 128 of tube 122 is connected through junction 129 and resistor 131 to ground G. From junction 124 a circuit extends through the condenser 132 and junction 133 to the grid 135 of the third stage amplifier tube 130, junction 133 being connected through the resistor 136 to ground G. From junction 124 on the plate of the tube 122, a circuit extends through the resistor 137 to junction 138 which is connected to the plate 139 of the tube 130. The cathode 140 of the tube 130 is connected through the junction 141 and resistor 142 to ground G. A condenser 144 is connected so as to bridge the resistor 142. From the plate junction 138 of tube 130 a circuit extends to junction 145 which is connected through resistor 146 to junction 95. Also, from junction 145 a circuit extends via line 2A to one terminal 2B of this winding being connected to junction 147 and thence to supply terminal 150. The terminal 147 is connected to the screen grid terminal 127 of the tube 130.

The three tubes, 106, 122, and 130 constitute a standard alternating current amplifier, as shown under the bracket marked AMP. Any standard alternating current amplifier utilizing vacuum tubes or transistors may be used. Transistors are advantageous although for purposes of illustration herein vacuum tubes are shown.

The operation of the apparatus can be understood most easily by reference to Figure 4. For convenience the various wave forms shown in Figure 4 are designated, from top to bottom, by the indicia 4A through 4J. The legend adjacent each of these waves states what is depicted thereby. In 4A there is illustrated one full wave of line voltage from the source L1 and L2. In 4B there is illustrated the voltage as read from one of the curve lines A to the center tab 57 of the transformer secondary 55. In curve 4C there is illustrated the voltage from the curve line B to the center tap 57. These voltages are read with reference to the center tap, and hence while the voltage on the curve line A is positive the voltage simultaneously on the curve line B, will be negative, and vice versa. The curves 4D, 4E, and 4F, illustrate the voltage as picked up by the probe 36. When the probe is halfway between the curves A and B and of course, spaced from the surface of the graph, a potential will be picked up by the probe which halfway is between the voltages applied to the curve line A and B. This voltage being halfway between the voltages that apply to these lines, it is consequently the same as the center tap holder, and the "curve" shown in 4D is accordingly a straight line of "zero" voltage. If the probe 36 should be situated so as to be nearer the curve line "A" it will have a voltage nearer the voltage of that line, and consequently show a voltage which is of the same sign as the voltage of curve 4B, although of somewhat lesser amount, since it is removed in space from that curve line A. When the probe 36 is near the curve line "B" it partakes of the voltage on that line and is of the same sign but of course is not of the same amount, being removed therefrom by a short distance in space.

The three curves 4G, 4H, and 4I, represent respectively the amplified signals applied to the probe for the conditions shown in 4D, 4E, and 4F. The curve 4J represents the phase of the voltage across the servomotor winding 1, this phase being shifted 90° (leading or lagging in respect to the line voltage). The amplified signal of the probe as represented by the curves 4G, 4H, and 4I, is applied to the other winding 2 of the servomotor 48 and consequently the servomotor will rotate in one direction or the other depending upon the position of the probe, whether it is nearer curve line "A" or nearer curve line "B" as shown respectively by Figures 4H and 4I. When the probe is centered between the curve lines A and B, the amplified probe voltage is zero and hence the servomotor does not rotate. The gearing between the servomotor 48 and the operating pulley 42 is of course chosen so that when the servomotor is energized by, for example, the amplified voltage shown in Figure 4H, the rotation will be such as to move the probe away from curve A, which served to cause such voltage to be picked up on the probe. Similarly when the probe picks up the amplified voltage as shown in the Figure 4I, the movement of the probe will be away from curve B, until the probe is again centered.

Figure 6 illustrates the method by which "curves" may be changed. In this figure the paper 18 has on it the two curved lines A and B which originally ran along the portions A1 and B1 corresponding generally to the shape shown in Figure 5. It is assumed that these curved lines A and B were drawn in pencil on the piece of paper 18. In the event that it is desired to change the shape of the curve, it is only necessary to erase that portion not desired, here for example, portions A1 and B1, and then draw a new curve so as to include the portions A2 and B2 which form a part of the graph desired to be depicted next. Thus, by the simple operation of erasing a pencil line and drawing in new pencil lines in the shape desired, an entirely new function may be depicted by the graph.

In Figure 7 there is illustrated another way in which an entirely satisfactory "graph" may be made for use in accordance with the present invention. For this purpose there is provided a sheet of nonconductive foil such as paper 120 and a somewhat smaller sheet of conductive paper 121 such as "Western Union Paper" which in its original condition is a single rectangular sheet not yet cut into the two portions 121A and 121B. This rectangular piece of "Western Union Paper" or other conductive paper should be of a size that will provide a margin with respect to the sheet 120 to which it is subsequently attached. Then, along the piece of Western Union Paper there is drawn a single "curve" according to the shape desired to be depicted. Next, using a scissors, a cut is made in the Western Union Paper along this line thus severing the original sheet into two portions. These are then adhesively attached to the underlying sheet 120 so as to provide a little space 120A between the two portions 121A and 121B. This little space is nonconductive, and represents the "graph." Provision is then made so as to electrically connect the conductive portions 121A and 121B to the sliprings 25 and 27, respectively, and the compounded sheet 120—121A—121B is then mounted on the drum 15 in the same way as previously described for sheet 18 so that the clip 21 makes contact with one of the conductive portions 121A or 121B and the clip 22 makes contact with the other portion. The ensuing operation so far as the apparatus now described is concerned is precisely the same as that described with reference to a graph composed of parallel pencil lines.

Where parallel lines are used, they may be drawn, instead of in pencil, by what is known as a "railroad pen" which draws parallel closely spaced lines. Conductive ink of any degree of conductivity may be used in such a pen to produce the desired curve. This method is also very convenient.

In Figure 8 there is illustrated another way of making a "graph" suitable for use with the present invention. In this method there is used an underlying electrically nonconductive sheet 130. On this there is first adhesively attached a small line of plastic at 131. Such plastic may be bought in rolls as articles of commence, with a suitable holder, and is capable of being applied around sharp bends or curving bends as desired. The graph is "drawn" by applying a conductive coating on the sheet in a narrow path immediately adjacent each side of the plastic "trail." This is accomplished simply by brushing on graphite or conductive ink or coloring the sheet with lead pencil. Enough of said conductive material is applied adjacent the plastic strip 131 so as to provide an area 132A on one side and an area 132B on the other side of the plastic strip. Then, if desired, a number of lines 133 parallel to what will be the axis of the drum 115 are applied, and edge lines 135 and 136 are added unless the drum is equipped with conductive bands corresponding to the bands 23 and 33 shown in Figure 2. It is usually convenient to also apply a somewhat broadened spot at 135A and 136A to be engaged respectively by the clips 22 and 21, of the drum. The plastic 131 is then stripped off and this leaves a narrow area which is electrically nonconductive in the space previously covered by the plastic strip. The composite is then used in precisely the same manner as the graph previously described.

By use of the present invention the conductivity of the graph portions need only be sufficient to insure that a potential applied to one portion of the conductive area or line will be distributed to all portions thereof. No greater conductivity than this is needed. This accordingly accounts for the possibility of successfully using graphs drawn with no more substantial conductor than a line of pencil on a paper sheet. By dispensing with the requirement of radio frequencies and inductances, it is possible to greatly reduce the size of the apparatus as compared with prior devices and to utilize simplified amplifiers, circuitries, and power supplies. According to prior practice it is necessary to conduct current through the graphs, which have in the past extended circumferentially in respect to the drum. Therefore, it is impossible with such inductively coupled devices to have a graph which is continuous entirely around the drum. According to the present invention, a sleeve may be prepared of paper or plastic material which is slipped on the drum, or conductive areas may be provided on a cylindrical plastic drum. In this form, not illustrated, the graph is made continuous around the entire circumference of the drum, and it is only necessary to provide electrical connections thereto internally in respect to the drum. In this way, the drum may rotate continuously without stopping and the function is repeated cyclically.

As many widely apparently different embodiments of this invention may be made without departing from the spirit and scope thereof, it is to be understood that I do not limit myself to the specific embodiments herein.

What I claim is:

1. An apparatus for following a pathway between a pair of conductive lines upon which an alternating potential is adapted to be imposed comprising a pair of conductive lines and means supporting said conductive lines in a prescribed plane, alternating potential supply lines adapted to be connected to said conductive lines, means for establishing a reference potential which is between the potentials applied to said conductive lines, a conductive probe, support means for supporting said probe for a path of movement in a plane spaced from the plane of said conductive lines, first power means connected to the means supporting said conductive lines for moving said probe and lines relative to each other at a selected rate of movement along a first coordinate axis of said conductive lines and second power means responsive to the difference in the potential in the space where said probe is located and said reference potential for moving said probe in its plane of motion relative to said lines and along a second coordinate axis of said lines and in a direction to return the probe to a position between but displaced in space from said lines.

2. The apparatus specified in claim 1 further characterized in that said second power means includes voltage follower means connected to said probe and to said reference potential and an amplifier connected to said voltage follower.

3. The apparatus specified in claim 1 further characterized in that said means supporting said conductive lines is a drum upon which said conductive lines are adapted to be carried and means is provided for rotating said drum according to a predetermined time schedule.

4. A curve follower apparatus comprising planar sheet means defining a curve, said sheet means providing spaced generally parallel configurations defining said curve, each of said configurations being at least sufficiently conductive so that a potential applied at one place therealong will be established elsewhere therealong, power supply circuit connections for two said configurations for applying alternating potentials on said configurations respectively, reference potential means for connection to said power supply circuit for establishing a reference potential between the potentials applied to said configurations, a conductive probe, support means connected to the probe for supporting it in space but close to the plane of said sheet means, first motor means connected to the probe support and sheet means for propelling said probe and sheet means relative to each other along a first coordinate axis of said curve and at a time-determined rate, second motor means connected to said probe support and sheet means for propelling them relatively along another coordinate axis of said curve, and error signal means connected to the probe and to said reference potential and to said second motor means, said error signal means being responsive to the potential gradient in space established by the power supply potential applied to said configurations, for actuating said second motor means to move the probe and sheet means relatively in a direction away from that configuration, the potential of which the probe potential most nearly approaches.

5. A curve follower as specified in claim 4 further characterized in that said configurations comprise a curve composed of substantially parallel spaced lines of conductive material, the space between said lines being non-conductive and a plurality of lines of conductive material outside of that space connected to the line of conductive material to which they are most adjacent.

6. The curve follower apparatus specified in claim 4 further characterized in that a drum is provided for supporting said sheet means and said first motor means is connected thereto for rotating said drum and the sheet thereon relative to said probe in the direction of said first coordinate axis.

7. A curve follower apparatus as specified in claim 4 further characterized in that said probe support comprises parallel ways arranged parallel to said second coordinate axis and said probe support is mounted thereon for movement therealong and second motor means is connected to said probe support for moving said probe support and probe therealong.

8. The curve follower apparatus specified in claim 4 further characterized in that said sheet means is composed of two halves of an originally integral conductive sheet which is cut apart along the line of the curve desired to be followed, said two halves being supported in spaced relation so as to provide a non-conductive space of generally uniform widths between said cut apart edges.

9. The curve follower apparatus of claim 4 further specified in that said error signal means includes a voltage follower having an input connected to said probe and to said reference potential and an output, and an amplifier having its input connected to the output of said voltage follower and an output connected to said second motor means for actuating said second motor means in response to the amplified error signal.

10. A curve follower apparatus comprising an electrically non-conductive drum having thereon a curve circumscribing the drum, said curve being composed of spaced substantially parallel lines of conductive material at least partially encircling the drum, the space between said lines being non-conductive, circuit means connecting said lines respectively to power supply terminals, means connected to said power supply terminals for establishing a reference potential between the potentials applied to said lines, first motor means connected to the drum for rotating it according to a time sequence, a track means and a support thereon, said track means being mounted with reference to the drum so that said support moves parallel to the axis of the drum, a conductive probe mounted on the support, the tip of said probe being adjusted so as to be in spaced relation to said drum, second motor means for moving said support back and forth along said track means and error signal means connected to the probe and to said reference potential and responsive to the error signal between them for moving the support away from that line, the potential of which the probe potential most nearly approaches.

11. A chart line follower comprising opposed electrically separated terminals of opposite polarity and extending linearly to define a chart line, a pick-off probe disposed in the electric field between said terminals and effectively tapping the electric field therebetween, said probe being movable to follow said line and normally operating at all times in non-contacting relationship with said opposite polarity terminals.

12. A chart line device comprising opposed electrically separated line terminals of opposite polarity and extending linearly to define a chart line, a pick-off probe having thereon an electrical probe terminal associated with and responsive to the potential gradient in space between said line terminals, said probe terminal being at all times in non-contacting relationship with said opposite polarity line terminals and responsive to the potential established thereon due to the potential gradient in space established by said line terminals.

References Cited in the file of this patent

UNITED STATES PATENTS

| | | |
|---|---|---|
| 2,588,386 | Hubbard et al. | Mar. 11, 1952 |
| 2,835,858 | Moseley | May 20, 1958 |

UNITED STATES PATENT OFFICE

CERTIFICATE OF CORRECTION

Patent No. 2,941,135                      June 14, 1960

James R. Anderson

It is hereby certified that error appears in the printed specification of the above numbered patent requiring correction and that the said Letters Patent should read as corrected below.

Column 7, line 38, for "ouput" read -- output--; column 9, line 35, for "commence" read -- commerce --.

Signed and sealed this 27th day of December 1960.

(SEAL)
Attest:
KARL H. AXLINE

Attesting Officer

ROBERT C. WATSON
Commissioner of Patents